(12) United States Patent
Kwon et al.

(10) Patent No.: US 11,189,102 B2
(45) Date of Patent: Nov. 30, 2021

(54) ELECTRONIC DEVICE FOR DISPLAYING OBJECT FOR AUGMENTED REALITY AND OPERATION METHOD THEREFOR

(71) Applicant: Samsung Electronics Co., Ltd., Suwon-si (KR)

(72) Inventors: Ohyoon Kwon, Suwon-si (KR); Younghak Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/772,421

(22) PCT Filed: Dec. 21, 2018

(86) PCT No.: PCT/KR2018/016399
§ 371 (c)(1),
(2) Date: Jun. 12, 2020

(87) PCT Pub. No.: WO2019/125029
PCT Pub. Date: Jun. 27, 2019

(65) Prior Publication Data
US 2021/0074067 A1 Mar. 11, 2021

(30) Foreign Application Priority Data
Dec. 22, 2017 (KR) .................. 10-2017-0178094

(51) Int. Cl.
| G06T 19/00 | (2011.01) |
| G06T 7/194 | (2017.01) |
| G06F 3/16 | (2006.01) |
| G06K 9/00 | (2006.01) |

(52) U.S. Cl.
CPC .............. G06T 19/006 (2013.01); G06F 3/16 (2013.01); G06K 9/00369 (2013.01); G06T 7/194 (2017.01); *G06T 2207/30196* (2013.01)

(58) Field of Classification Search
None
See application file for complete search history.

(56) References Cited

U.S. PATENT DOCUMENTS

| 7,053,915 B1 * | 5/2006 | Jung .................. G10H 1/368 345/629 |
| 7,444,353 B1 * | 10/2008 | Chen .................. G06F 16/683 |
| 7,863,510 B2 | 1/2011 | Kim et al. |
| 8,910,201 B1 * | 12/2014 | Zamiska .......... H04N 21/44222 725/34 |

(Continued)

FOREIGN PATENT DOCUMENTS

| KR | 10-2014-0045574 A | 4/2014 |
| KR | 10-1679239 B1 | 11/2016 |

(Continued)

*Primary Examiner* — Jason A Pringle-Parker
(74) *Attorney, Agent, or Firm* — Jefferson IP Law, LLP

(57) ABSTRACT

An electronic device according to various embodiments may comprise a display, a camera module, a microphone, and at least one processor, wherein the at least one processor is configured to: display, on the display, an image obtained using the camera module; activate the microphone; receive a music through the activated microphone; select an augmented reality (AR) object on the basis of the genre of the received music; and display the selected AR object overlappingly on the displayed image.

18 Claims, 17 Drawing Sheets

(56) References Cited

U.S. PATENT DOCUMENTS

| | | |
|---|---|---|
| 9,098,167 B1 | 8/2015 | Issa et al. |
| 9,524,282 B2 | 12/2016 | Algreatly |
| 2006/0009979 A1* | 1/2006 | McHale .............. A63F 13/5375 704/270 |
| 2007/0180979 A1* | 8/2007 | Rosenberg ........... G02B 27/017 84/611 |
| 2007/0260984 A1* | 11/2007 | Marks .................... A63F 13/79 715/706 |
| 2009/0300525 A1* | 12/2009 | Jolliff ................ H04M 1/72451 715/764 |
| 2011/0300929 A1 | 12/2011 | Tardif et al. |
| 2012/0007884 A1 | 1/2012 | Kim |
| 2013/0070093 A1* | 3/2013 | Rivera ................. G06Q 20/123 348/143 |
| 2013/0265333 A1 | 10/2013 | Ainsworth et al. |
| 2013/0290106 A1 | 10/2013 | Bradley et al. |
| 2014/0122086 A1 | 5/2014 | Kapur et al. |
| 2014/0161263 A1* | 6/2014 | Koishida ............... G06F 16/683 381/56 |
| 2014/0320389 A1 | 10/2014 | Scavezze et al. |
| 2015/0155006 A1* | 6/2015 | Chou ..................... H04N 9/802 386/230 |
| 2015/0243083 A1* | 8/2015 | Coggins ............... A61B 5/0205 345/633 |
| 2017/0105081 A1 | 4/2017 | Jin et al. |
| 2017/0161382 A1 | 6/2017 | Ouimet et al. |
| 2017/0364589 A1 | 12/2017 | Roswell |
| 2018/0136319 A1* | 5/2018 | Send ....................... G01S 17/46 |

FOREIGN PATENT DOCUMENTS

| | | |
|---|---|---|
| KR | 10-2017-0041447 A | 4/2017 |
| KR | 10-2017-0075321 A | 7/2017 |

* cited by examiner

ELECTRONIC DEVICE FOR DISPLAYING OBJECT FOR AUGMENTED REALITY AND OPERATION METHOD THEREFOR

TECHNICAL FIELD

Various embodiments relate to a method and an electronic device for displaying an object for augmented reality.

BACKGROUND ART

With the development of digital technology, various electronic devices, such as mobile communication terminals, personal digital assistants (PDAs), digital diaries, smart phones, tablet personal computers (PCs), or wearable devices, have been distributed. Various electronic devices may provide various experiences to a user. For example, an electronic device may provide augmented reality (AR) that shows virtual information by adding it to a real object. An electronic device for providing augmented reality may acquire a preview image of a real object through a camera and may recognize (or identify) the real object. The electronic device may display information (e.g., a virtual object) about augmented reality on the preview image based on the recognized object. Such augmented reality may be provided to a user through, for example, a game application or a camera application.

DISCLOSURE OF INVENTION

Technical Problem

An electronic device may display an augmented reality (AR) object superimposed on a preview image obtained through a camera. In order to display the AR object, user input to call or search the AR object may be required. Accordingly, a method for displaying an AR object without requiring user input to call or search an AR object in the state in which a preview image is displayed in the electronic device may be required.

Various embodiments may provide an electronic device and method for displaying an AR object on a preview image based on information on music reproduced around the electronic device.

The technical problems to be addressed by this disclosure are not limited to those described above, and other technical problems, which are not described above, may be clearly understood by a person ordinarily skilled in the related art, to which this disclosure belongs.

Solution to Problem

An electronic device according to various embodiments may include a display, a camera module, a microphone, and at least one processor. The at least one processor may be configured to: display an image acquired using the camera module through the display; activate the microphone; receive music through the microphone; select a augmented reality (AR) object based on a genre of the music; and display the AR object in a state of being superimposed on the image.

A method of operating an electronic device according to various embodiments may include: displaying an image acquired using a camera module of the electronic device through a display of the electronic device; activating a microphone of the electronic device; receiving music through the microphone; selecting a augmented reality (AR) object based on a genre of the music; and displaying the AR object in a state of being superimposed on the image.

Advantageous Effects of Invention

With an electronic device and a method according to various embodiments, it is possible to display an AR object corresponding to music playing around the electronic device without receiving user input for selecting the AR object.

The effects capable of being obtained by this disclosure are not limited to those described above, and other effects, which are not described above, may be clearly understood by a person ordinarily skilled in the technical field, to which this disclosure belongs.

BEST MODE FOR CARRYING OUT THE INVENTION

Figure 1:
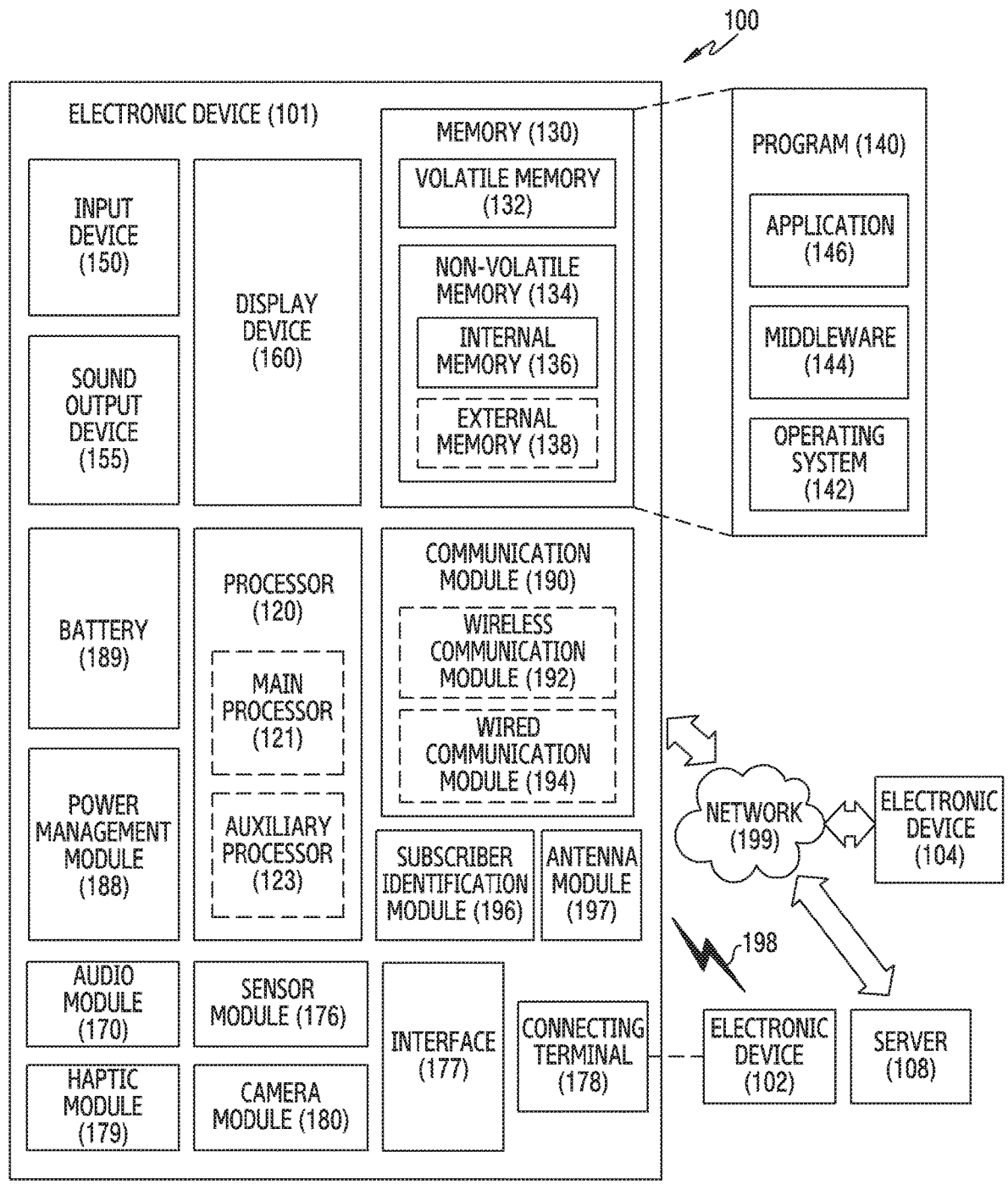
FIG. 1 is a block diagram of an electronic device according to various embodiments in a network environment.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
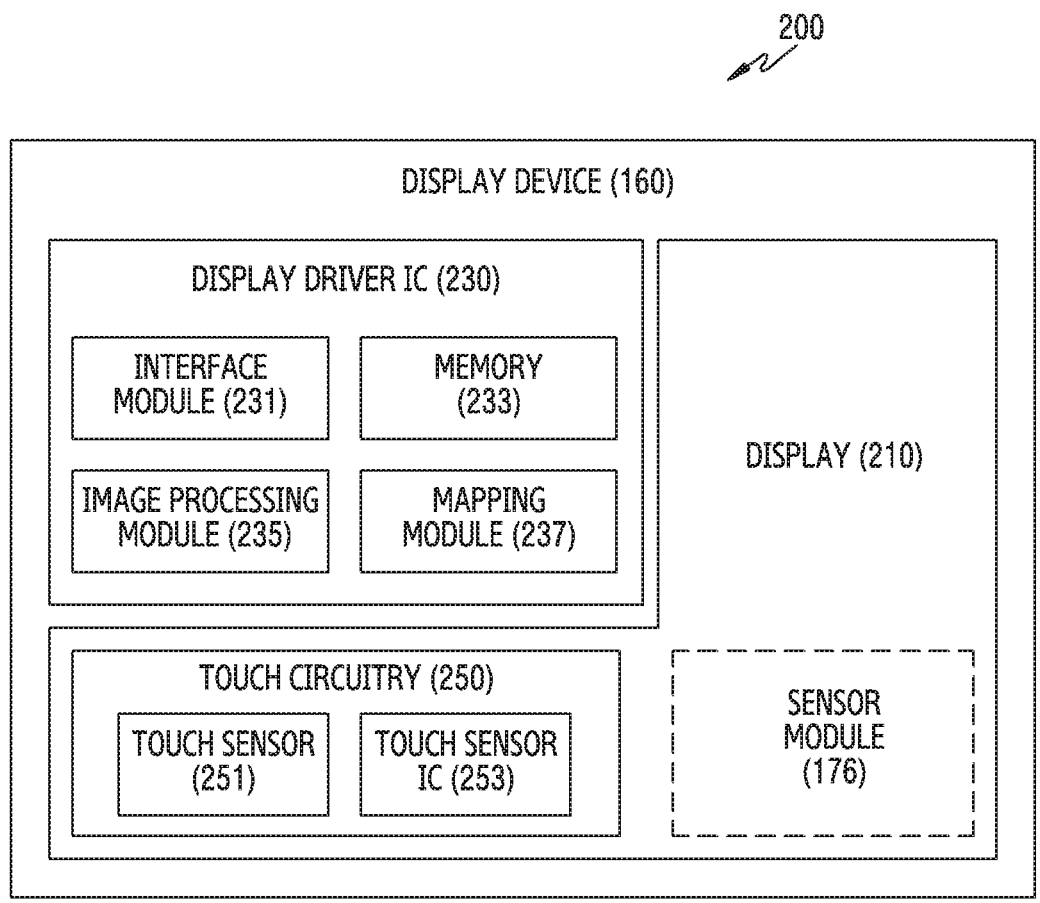
FIG. 2 is a block diagram of a display device according to various embodiments.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
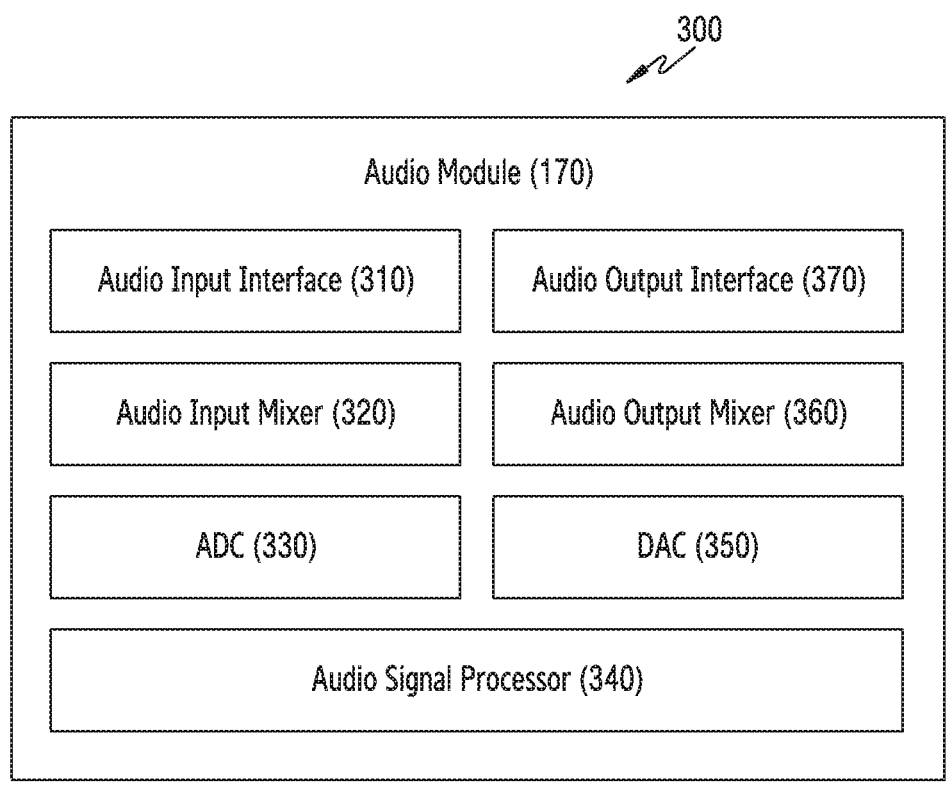
FIG. 3 is a block diagram of an audio module according to various embodiments.

FIG. 3 is a block diagram 300 illustrating the audio module 170 according to various embodiments. Referring to FIG. 3, the audio module 170 may include, for example, an audio input interface 310, an audio input mixer 320, an analog-to-digital converter (ADC) 330, an audio signal processor 340, a digital-to-analog converter (DAC) 350, an audio output mixer 360, or an audio output interface 370.

The audio input interface 310 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 310 may be connected with the external electronic device 102 directly via the connecting terminal 178, or wirelessly (e.g., Bluetooth™ communication) via the wireless communication module 192 to receive the audio signal. According to an embodiment, the audio input interface 310 may receive a control signal (e.g., a volume adjustment signal received via an input button) related to the audio signal obtained from the external electronic device 102. The audio input interface 310 may include a plurality of audio input channels and may receive a different audio signal via a corresponding one of the plurality of audio input channels, respectively. According to an embodiment, additionally or alternatively, the audio input interface 310 may receive an audio signal from another component (e.g., the processor 120 or the memory 130) of the electronic device 101.

The audio input mixer 320 may synthesize a plurality of inputted audio signals into at least one audio signal. For example, according to an embodiment, the audio input mixer 320 may synthesize a plurality of analog audio signals inputted via the audio input interface 310 into at least one analog audio signal.

The ADC 330 may convert an analog audio signal into a digital audio signal. For example, according to an embodiment, the ADC 330 may convert an analog audio signal received via the audio input interface 310 or, additionally or alternatively, an analog audio signal synthesized via the audio input mixer 320 into a digital audio signal.

The audio signal processor 340 may perform various processing on a digital audio signal received via the ADC 330 or a digital audio signal received from another component of the electronic device 101. For example, according to an embodiment, the audio signal processor 340 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 340 may be implemented in the form of an equalizer.

The DAC 350 may convert a digital audio signal into an analog audio signal. For example, according to an embodiment, the DAC 350 may convert a digital audio signal processed by the audio signal processor 340 or a digital audio signal obtained from another component (e.g., the processor (120) or the memory (130)) of the electronic device 101 into an analog audio signal.

The audio output mixer 360 may synthesize a plurality of audio signals, which are to be outputted, into at least one audio signal. For example, according to an embodiment, the audio output mixer 360 may synthesize an analog audio signal converted by the DAC 350 and another analog audio signal (e.g., an analog audio signal received via the audio input interface 310) into at least one analog audio signal.

The audio output interface 370 may output an analog audio signal converted by the DAC 350 or, additionally or alternatively, an analog audio signal synthesized by the audio output mixer 360 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 370 may output audio signals having a plurality of different channels (e.g., stereo channels or 5.1 channels) via at least some of the plurality of speakers. According to an embodiment, the audio output interface 370 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 320 or the audio output mixer 360, at least one digital audio signal by synthesizing a plurality of digital audio signals using at least one function of the audio signal processor 340.

According to an embodiment, the audio module 170 may include an audio amplifier (not shown) (e.g., a speaker amplifying circuit) that is capable of amplifying an analog audio signal inputted via the audio input interface 310 or an audio signal that is to be outputted via the audio output interface 370. According to an embodiment, the audio amplifier may be configured as a module separate from the audio module 170.

Figure 4:
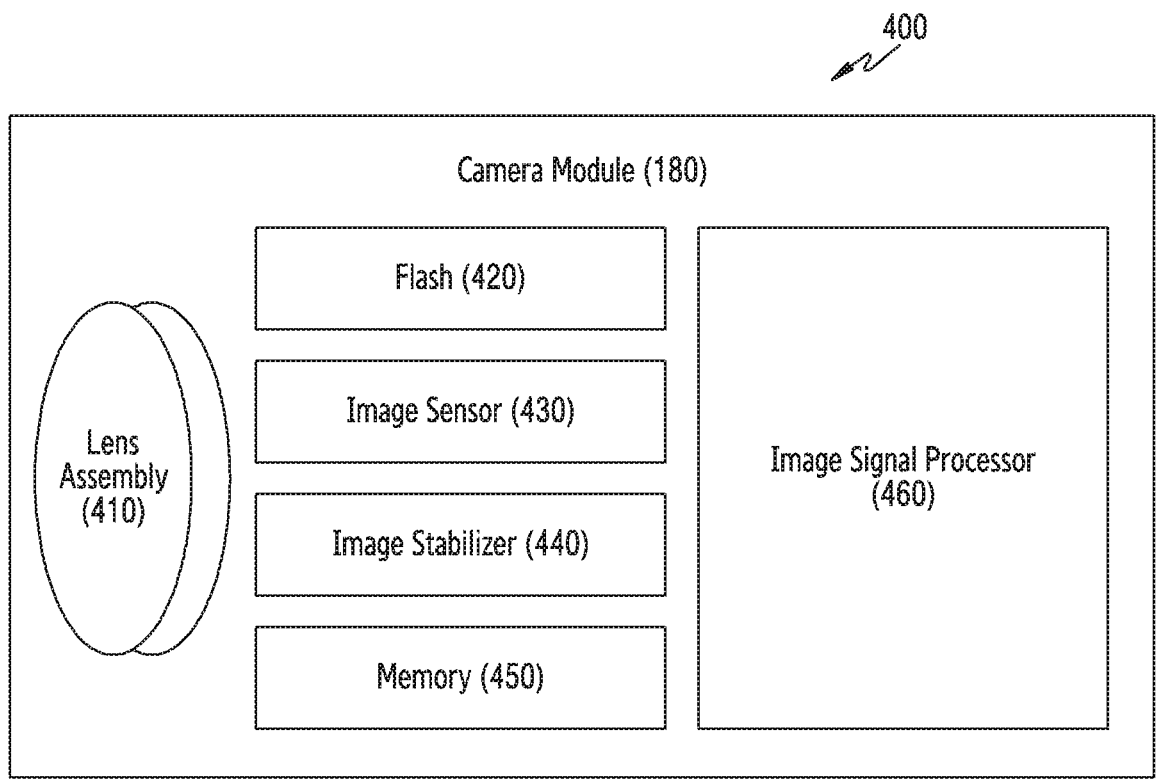
FIG. 4 is a block diagram of a camera module according to various embodiments.

FIG. 4 is a block diagram 400 illustrating the camera module 180 according to various embodiments. Referring to FIG. 4, the camera module 180 may include a lens assembly 410, a flash 420, an image sensor 430, an image stabilizer 440, memory 450 (e.g., buffer memory), or an image signal processor 460. The lens assembly 410 may collect light emitted or reflected from an object whose image is to be taken. The lens assembly 410 may include one or more lenses. According to an embodiment, the camera module 180 may include a plurality of lens assemblies 410. In such a case, the camera module 180 may form, for example, a dual camera, a 360-degree camera, or a spherical camera. Some of the plurality of lens assemblies 410 may have the same lens attribute (e.g., view angle, focal length, autofocusing, f number, or optical zoom), or at least one lens assembly may have one or more lens attributes different from those of another lens assembly. The lens assembly 410 may include, for example, a wide-angle lens or a telephoto lens. The flash 420 may emit light that is used to reinforce light reflected from an object. According to an embodiment, the flash 420 may include one or more light emitting diodes (LEDs) (e.g., a red-green-blue (RGB) LED, a white LED, an infrared (IR) LED, or an ultraviolet (UV) LED) or a xenon lamp.

The image sensor 430 may obtain an image corresponding to an object by converting light emitted or reflected from the object and transmitted via the lens assembly 410 into an electrical signal. According to an embodiment, the image sensor 430 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 430 may be implemented using, for example, a charged coupled device (CCD) sensor or a complementary metal oxide semiconductor (CMOS) sensor.

The image stabilizer 440 may move the image sensor 430 or at least one lens included in the lens assembly 410 in a particular direction, or control an operational attribute (e.g., adjust the read-out timing) of the image sensor 430 in response to the movement of the camera module 180 or the electronic device 101 including the camera module 180. This allows compensating for at least part of a negative effect (e.g., image blurring) by the movement on an image being captured. According to an embodiment, the image stabilizer 440 may sense such a movement by the camera module 180 or the electronic device 101 using a gyro sensor (not shown) or an acceleration sensor (not shown) disposed inside or outside the camera module 180. According to an embodiment, the image stabilizer 440 may be implemented, for example, as an optical image stabilizer.

The memory 450 may store, at least temporarily, at least part of an image obtained via the image sensor 430 for a subsequent image processing task. For example, if image capturing is delayed due to shutter lag or multiple images are quickly captured, a raw image obtained (e.g., a Bayer-patterned image, a high-resolution image) may be stored in the memory 450, and its corresponding copy image (e.g., a low-resolution image) may be previewed via the display device 160. Thereafter, if a specified condition is met (e.g., by a user's input or system command), at least part of the raw image stored in the memory 450 may be obtained and processed, for example, by the image signal processor 460. According to an embodiment, the memory 450 may be configured as at least part of the memory 130 or as a separate memory that is operated independently from the memory 130.

The image signal processor 460 may perform one or more image processing with respect to an image obtained via the image sensor 430 or an image stored in the memory 450. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 460 may perform control (e.g., exposure time control or read-out timing control) with respect to at least one (e.g., the image sensor 430) of the components included in the camera module 180. An image processed by the image signal processor 460 may be stored back in the memory 450 for further processing, or may be provided to an external component (e.g., the memory 130, the display device 160, the electronic device 102, the electronic device 104, or the server 108) outside the camera module 180. According to an embodiment, the image signal processor 460 may be configured as at least part of the processor 120, or as a separate processor that is operated independently from the processor 120. If the image signal processor 460 is configured as a separate processor from the processor 120, at least one image processed by the image signal processor 460 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 5:
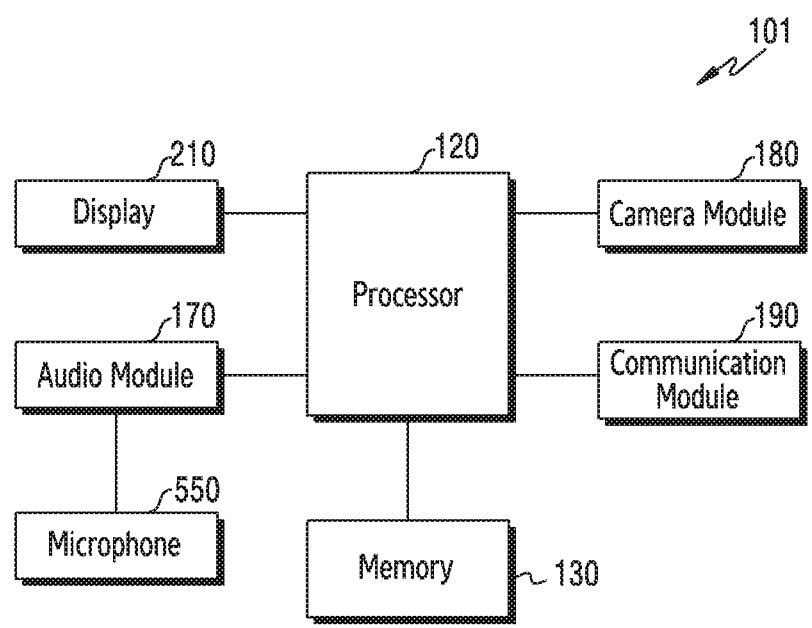
FIG. 5 illustrates an exemplary functional configuration of an electronic device according to various embodiments.

FIG. 5 illustrates an exemplary functional configuration of an electronic device 101 according to various embodiments.

Referring to FIG. 5, the electronic device 101 may include a camera module 180, an audio module 170, a microphone 550, a communication module 190, a display 210, memory 130, and a processor 120. However, this disclosure is not limited thereto, and some components may be omitted or other components may be added.

The camera module 180 may acquire an image (e.g., a still image and a moving image or video) (or take a photograph). For example, an image signal processor 460 of the camera module 180 may distinguish an object (e.g., a person) and a background included in an image (e.g., a preview image or an image stored in the memory 130) from each other. The image signal processor 460 may extract feature points related to an image (e.g., a preview image or an image included in the memory 130). The feature points may be used to identify (or recognize) the face (e.g., eyes, nose, or mouth) or gesture (or posture) of a person included in the image. The image signal processor 460 may be separated from the camera module 180 or implemented as part of the processor 120.

The audio module 170 may acquire (or receive) an audio signal (e.g., sound or music) from the outside of the electronic device 101 through the microphone 550 (e.g., the input device 150). The acquired audio signal may include music sound. For example, the audio module 170 (e.g., an audio signal processor 340) may perform preprocessing to acquire information (e.g., a genre of music) related to music included in the acquired audio signal. For example, the audio module 170 may perform processing related to removing noise from an audio signal or processing related to extracting feature points of the audio signal. As another example, the audio module 170 may transmit the acquired audio signal to the processor 120 such that the processor 120 performs the above-mentioned multiple kinds of processing.

The processor 120 may control the overall operation of the electronic device 101. The processor 120 may receive commands of other components (e.g., the camera module 180, the audio module 170, the communication module 190, the display 210, and the memory 130), and may interpret the received command. The processor 120 may perform calculation or may process data in response to the interpreted command. The processor 120 may be implemented as software, may be implemented as hardware such as a chip, circuitry, or the like, or may be implemented as a set of software and hardware. The processor 120 may be a single processor or a set of multiple processors.

The processor 120 may execute an application (e.g., the application 143) stored in the memory 130. The processor 120 may acquire an image using the camera module 180 through the application. The application may provide an augmented reality (AR) object that is superimposed on or floated on the image. Hereinafter, the application will be referred to as a "camera application". However, the application described herein is not limited to a camera application, and may be any application that uses the camera module 180.

Based on executing the camera application, the processor 120 may activate the microphone 550 (or the audio module 170) and may receive an audio signal through the microphone 550. The audio signal received through the microphone 550 may include music sound. That is, in various embodiments, the electronic device 101 may be located in an environment in which music is being reproduced.

The processor 120 may receive music around the electronic device 101 through the microphone 550 based on executing the camera application. For example, the processor 120 may activate the microphone 550 in response to initiating execution of the camera application. As another example, the processor 120 may activate the microphone 550 in response to receiving input for an object included in a user interface (UI) of the camera application.

The processor 120 may receive music around the electronic device 101 through the microphone 550 while displaying the preview image through the camera application. The processor 120 may acquire (or identify) information (e.g., a genre of music) related to music received through the microphone 550. For example, the processor 120 may perform processing related to noise removal from the audio signal in order to acquire information related to music included in the audio signal. The processor 120 may perform processing related to extraction of feature points of the audio signal in order to acquire information related to music included in the audio signal.

In some embodiments, the processor 120 may use a database stored in a server (e.g., the server 108) to acquire information about music included in the audio signal. The processor 120 may transmit an audio signal (e.g., a noise processing result of an audio signal or a feature point processing result) to the server through the communication module 190. The server may be associated with automatic search of music. The server may store a database of multiple kinds of music. The server may determine music corresponding to an audio signal received from the electronic device 101 using the database. The server may transmit information related to the determined music to the electronic device 101. The processor 120 may receive information related to music from the server through the communication module 190. The processor 120 may identify information related to a genre of music from the information related to music. At least some of the above-described operations of the server may also be performed by the electronic device 101.

In some other embodiments, the processor 120 may estimate or guess information related to music from an audio signal (e.g., a result of noise processing or feature processing of an audio signal). For example, the processor 120 may extract one or more of beats per minute (BPM) of music, amplitude of music, or frequency of music from the audio signal. The processor 120 may guess (or identify) information related to music (e.g., a genre of music) based on one or more of BPM, amplitude, or frequency of music.

The genre of music described herein may include information related to intensity, tempo, or mood of music in addition to a genre of music, such as reggae, pop, rock, heavy metal, R&B, or jazz. That is, the processor 120 may identify a genre of music, intensity of music, tempo of music, or mood of music as information related to music. For example, the processor 120 may identify fast reggae and slow reggae within the reggae genre.

The processor 120 may provide an AR object through the camera application based on the identified music information. The processor 120 may determine an AR object to be displayed based on a genre of music (e.g., genre, speed, mood, or intensity). For example, the processor 120 may determine a set of AR objects corresponding to a genre of music.

The processor 120 may display an AR object corresponding to a genre of music (e.g., genre, speed, mood, or intensity). For example, the processor 120 may superimpose or float an AR object corresponding to a genre of music on a preview image displayed through the camera application. The processor 120 may automatically display an AR object corresponding to music playing around the electronic device 101 without receiving user input for selecting the AR object. The processor 120 may provide an AR object based on automatically identifying a genre of music (e.g., genre, tempo, mood, or intensity) playing around the electronic device 101 in a procedure of acquiring an image.

The processor 120 may analyze an image in order to determine a position (e.g., coordinates) to display the AR object. For example, the processor 120 may distinguish an object (e.g., a person) and a background included in an image from each other, or may extract feature points related to the image. The processor 120 may identify (or recognize) the eyes, nose, mouth, head, torso, or gesture (or posture) of a person included in the image based on the extracted feature points. The processor 120 may display an AR object corresponding to the configuration (e.g., background, person, or action) of the image at a position corresponding to the configuration. For example, the processor 120 may display an AR object floated on the preview image based on the genre of music received through the microphone 550 in the camera application. The processor 120 may call an AR object stored in the memory 130 or may control the communication module 190 to receive an AR object from the server.

In some embodiments, while the electronic device 101 is executing a camera application, music does not play around the electronic device 101, but the electronic device 101 may reproduce (or output) music through the audio module 170. When the electronic device reproduces (or outputs) music through the audio module 170, the processor 120 may display an AR object based on information about music reproduced by the electronic device 101. For example, when the electronic device 101 reproduces music, the processor 120 may not activate the microphone 550. For example, the processor 120 may determine whether the electronic device 101 reproduces (or outputs) music through the audio module 170 in response to executing the camera application. When it is determined that the electronic device 101 reproduces music, the processor 120 may not activate the microphone 550, and when it is determined that the electronic device 101 does not reproduces music, the processor 120 may activate the microphone 550. When the electronic device 101 reproduces music, the processor 120 is may determine an AR object (or a set of AR objects) based on the information about the music stored (or temporarily stored) in the memory 130 (or temporarily stored). The processor 120 may display the determined AR object to be superimposed on the preview image.

In some embodiments, based on acquiring (or capturing) a moving image or video through the camera application, the processor 120 may store information related to the moving image or video and an AR object related to the moving image or video. For example, the processor 120 may capture a moving image or video using the camera module 180 through the camera application in an environment in which music plays around the electronic device 101. The processor 120 may extract music from audio data included in a moving image or video or may acquire information about music (e.g., genre, speed, mood, or intensity). For example, the processor 120 may acquire information about music through a server, or may acquire information about music through processing of the processor 120. The processor 120 may identify, for example, the intensity, tempo, mood, or the like of music for each frame of a moving image or video. The processor 120 may determine information about an AR object corresponding to the moving image or video, based on at least one of the genre, intensity, speed, or mood of music identified for each frame. For example, the information about the AR object corresponding to the moving image or video may include the type and coordinates of the AR object to be displayed for each frame of the moving image or video. The processor 120 may store information about the AR object corresponding to the moving image or video in the memory 130 along with the moving image or video.

The processor 120 may reproduce the stored moving image or video based on user input. During reproduction of the moving image or video, the processor 120 may display the AR object floated on the moving image or video based on the information about the AR object. During the reproduction of the moving image or video, the processor 120 may display the AR object based on information about the AR object stored with the moving image or video (e.g., a frame to display the AR object, a type of the AR object, and coordinates of the AR object). The AR object floated on the moving image or video may be changed based on music included in the moving image or video during the reproduction of the moving image or video.

The communication module 190 may establish a communication link between the electronic device 101 and an external electronic device (e.g., a server related to automatic search of music, or a server related to provision of an AR object), and may perform communication through the established communication link. For example, the communication module 190 may transmit an audio signal acquired through the microphone 550 of the electronic device 101 to the server related to automatic search of music. The communication module 190 may receive information about music or included in the audio signal from the server or information of the genre of music. The communication module 190 may transmit information about the genre of music to a server capable of providing an AR object. The communication module 190 may receive an AR object (or a set of AR objects) corresponding to a genre of music from the server. In some cases, when the electronic device 101 performs a music search function or stores an AR object, the above-described operations of the communication module 190 may be omitted.

The display 210 may display a screen of the electronic device 101. The display 210 may display various kinds of information. The display 210 may display a user interface related to the camera application. The display 210 may display an image acquired through the camera module 180. The display 210 may display an AR object superimposed on or floated on an image.

The memory 130 may be a set of one or more memories. The memory 130 may execute instructions stored in the memory 130 based on signaling with the processor 120. The memory 130 may store data and/or commands received from other components (e.g., the processor 120, the camera module 180, the communication module 190, and the audio module 170, display 210) or generated by the other components. In various embodiments, the memory 130 may store a camera application. The memory 130 may store a plurality of AR objects related to a genre of music. The plurality of AR objects may be stored in the step of manufacturing the electronic device 101. Alternatively, the plurality of AR objects may be downloaded from a server (e.g., a server capable of providing AR objects). The memory 130 may store a plurality of AR objects classified according to genres of music. The memory 130 may store AR objects classified according to the tempo (or intensity, or the like) of music, even within one genre (i.e., one category).

Figure 6:
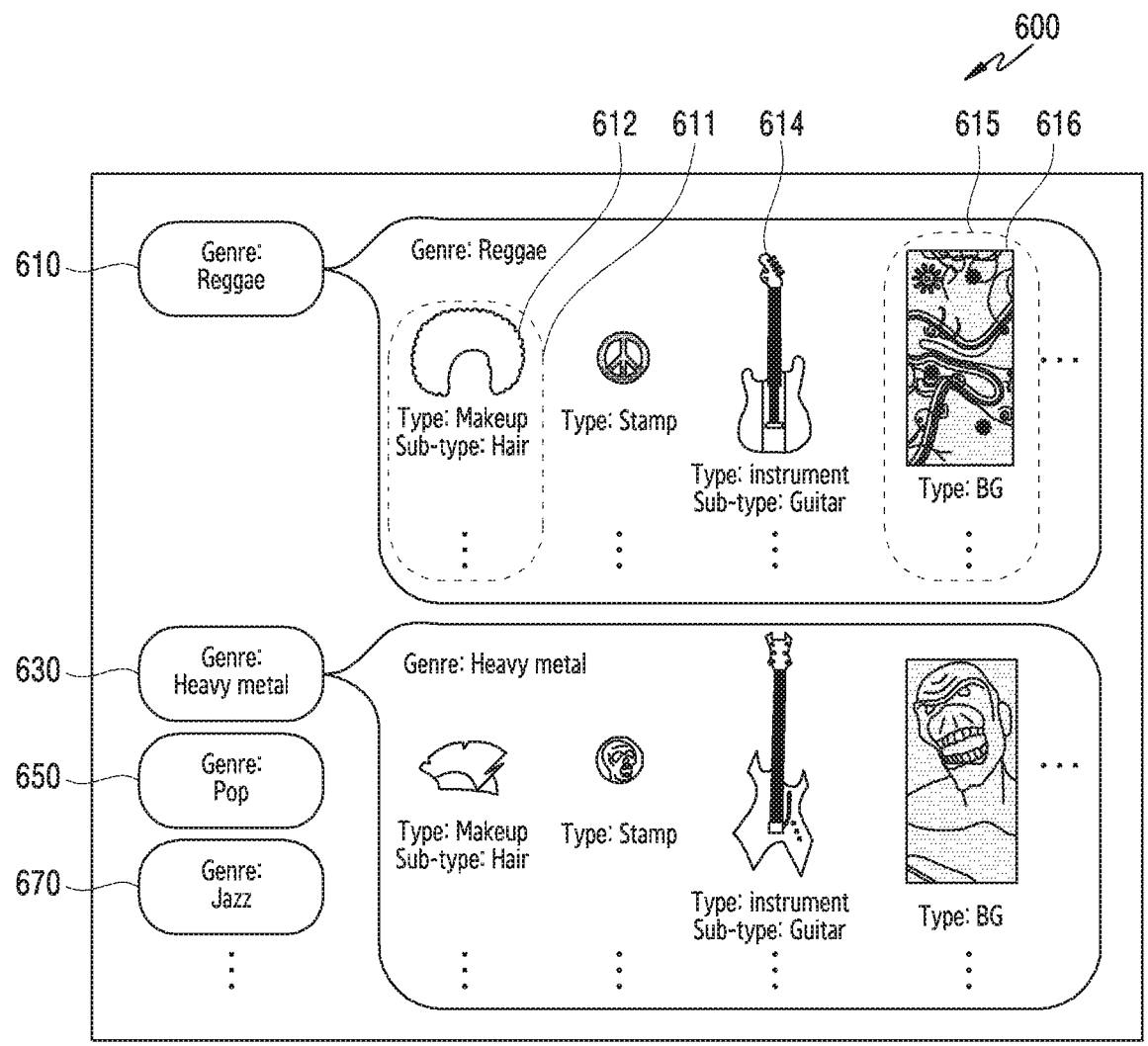
FIG. 6 is a view for describing a database that stores AR objects according to various embodiments.

FIG. 6 is a view for describing a database 600 that stores AR objects according to various embodiments. However, the database 600 is merely illustrated as a conceptual view for describing a database for storing AR objects, and a database for storing AR objects may be implemented in a table format.

Referring to FIG. 6, the memory 130 may store a plurality of AR objects related to music, like the database 600. In some cases, the database 600 may be stored in a server.

The database 600 may store a plurality of AR objects classified according to genres of music. For example, the database 600 may classify a plurality of AR objects according to a plurality of genres including a reggae genre 610, a heavy metal genre 630, a pop genre 650, and a jazz genre 670. An AR object may be an image or sticker having a property, characteristic, and mood of a genre to which the AR object belongs. For example, AR objects included in the reggae genre 610 may have reggae mood, and AR objects included in the heavy metal genre 630 may have heavy metal mood.

A plurality of AR objects may be divided into subclasses within each genre. For example, the subclasses may include a makeup type, a stamp type, an instrument type, a background type, an accessory type (not shown), and the like. For example, AR objects belonging to the makeup type may be a hairstyle sticker (or image) and the like. For example, AR objects belonging to the musical instrument type may be a guitar sticker, a piano sticker (not illustrated), a drum sticker (not illustrated), and the like. For example, AR objects belonging to the accessory type (not illustrated) may be a hat sticker, a sunglasses sticker, a clothing sticker, or the like. However, the plurality of genres and sub-classes illustrated in the database 600 are merely examples and are not limited thereto.

The database 600 may include a plurality of AR objects even within one sub-class included in one genre. For example, AR objects 611 corresponding to the hairstyle of the reggae genre 610 may include a plurality of hair stickers (not illustrated) as well as the hair sticker 612. For example, the plurality of hair stickers of the reggae genre 610 may include a hair sticker having mood of fast reggae and a hair sticker having mood of slow reggae. For example, the AR objects 615 corresponding to the background of the reggae genre 610 include a background sticker having mood of fast reggae (e.g., a background sticker 616) and a background sticker having mood of slow reggae. However, without being limited to speed, the database 600 may also include a plurality of AR objects according to mood or other factors, even within the reggae genre 610.

In various embodiments, the processor 120 may call corresponding AR objects from the database 600 according to a genre of music identified while executing the camera application. For example, the processor 120 may identify a genre of music received through the microphone 550 or may identify a genre of music reproduced through the audio module 170. For example, based on the genre of identified music, the processor 120 may receive AR objects from the database 600 stored in the memory 130 or may receive AR objects from the database 600 stored in the server.

For example, when the genre of identified music is reggae, the processor 120 may call an AR object (or a set of AR objects) included in the reggae genre 610 from the database 600. Based on analyzing an image (e.g., a preview image), the processor 120 may float an AR object included in the reggae genre 610 at a corresponding position on the image. For example, the processor 120 may display a background sticker 616 on the background of the image, and superimpose a hair sticker 612 on the head of a person included in the image.

For example, the processor 120 may identify whether the identified music is fast reggae or slow reggae, even within the reggae genre. When the identified music is fast reggae, the processor 120 may float a hair sticker having mood of the fast reggae among AR objects 611 corresponding to the hairstyle of the reggae genre 610. When the identified music is slow reggae, among the AR objects 611 corresponding to the hairstyle of the reggae genre 610, the processor 120 may float a hair sticker having mood of the slow reggae. As another example, when the genre of identified music is reggae, the processor 120 may randomly float a hair sticker among the AR objects 611 corresponding to the hairstyle of the reggae genre 610.

Based on analyzing an image (e.g., a preview image), the processor 120 may identify a gesture (or posture) of a person included in the image. Based on the identification of the gesture of the person from the image, the processor 120 may float an AR object corresponding to the gesture of the person. For example, when the genre of identified music is reggae and the identified gesture is a gesture of playing a guitar, the processor 120 may float a guitar sticker 614 included in the reggae genre 610. The processor 120 may float the guitar sticker 614 such that the person included in the image appears to play a guitar. When the genre of identified music is reggae and the identified gesture is a gesture of playing a drum, the processor 120 may float a drum sticker (not illustrated) included in the reggae genre 610.

According to various embodiments described above, an electronic device (e.g., the electronic device 101) may include a display (e.g., display 210), a camera module (e.g., the camera module 180), a microphone (e.g., the microphone 550), and at least one processor (e.g., the processor 120). The at least one processor may be configured to: display an image acquired using the camera module through the display; activate the microphone; receive first music through the microphone; select a first augmented reality (AR) object based on a genre of the first music; and display the first AR object in the state of being superimposed on the image.

In various embodiments, the at least one processor may be configured to: identify a posture of a person included in the image; select a second AR object corresponding to the identified posture and the genre of the first music; and display the second AR object in the state of being superimposed on the image.

In various embodiments, the at least one processor may be configured to: identify whether or not the electronic device reproduces second music in the state in which the microphone is not activated; select a second AR object based on the second music in response to identifying that the electronic device reproduces the second music; and display the second AR object in the state of being superimposed on the image.

In various embodiments, the at least one processor may be configured to: acquire a moving image or video through the camera module; identify a genre of a second music included in audio data of the moving image or video; acquire information about a second AR object corresponding to the moving image or video based on the genre of the second music; and store the information about the second AR along with the moving image or video. For example, the information about the second AR object corresponding to the moving image or video may include at least one of a frame to display the second AR object, a type of the second AR object, or a position to display the second AR object among frames of the moving image or video.

In various embodiments, the at least one processor may be configured to determine a genre of the first music based on at least one of beats per minute (BPM), an amplitude, or a frequency of the first music.

In various embodiments, the electronic device may further include memory (e.g., the memory 130) configured to store a plurality of AR objects, and the at least one processor may be configured to select the first AR object corresponding to the genre of the first music among the plurality of AR objects stored in the memory. For example, the at least one processor may be configured to determine the first AR object among the plurality of first AR objects based on at least one of tempo, mood, or intensity of the first music when a plurality of AR objects corresponding to the genre of the first music are included in the plurality of AR objects.

In various embodiments, the electronic device may further include a communication module (e.g., the communication module 190), the at least one processor may configured to: transmit a signal about the first music to the server through the communication module; and receive information about the first music from the server, and the information about the first music may include information about the genre of the first music.

In various embodiments, the at least one processor may be configured to display an indicator for representing existence of at least one AR object about the first music through the display.

Figure 7:
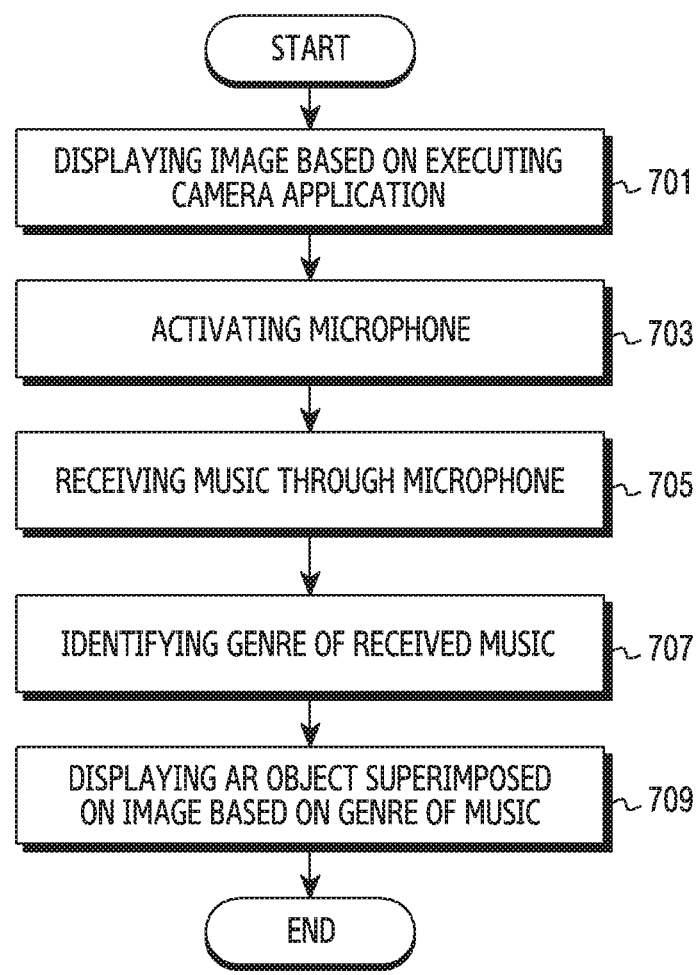
FIG. 7 illustrates an exemplary operation of an electronic device according to various embodiments.

FIG. 7 illustrates an exemplary operation of an electronic device 101 according to various embodiments.

Referring to FIG. 7, in operation 701, the processor 120 may display an image based on executing a camera application. For example, the image may be a preview image acquired through the camera module 180. However, this disclosure is not limited thereto, and the processor 120 may display an image stored in the memory 130 through a photo album (or a gallery) UI included in the camera application.

In operation 703, the processor 120 may activate the microphone 550 (or the audio module 170). The processor 120 may activate the microphone 550 while the image is being displayed. For example, the processor 120 may activate the microphone 550 in response to initiating execution of the camera application. As another example, the processor 120 may activate the microphone 550 in response to receiving input for an object included in a user interface (UI) of the camera application.

In operation 705, the processor 120 may receive music through the activated microphone 550.

In operation 707, the processor 120 may identify the genre of the received music. In some embodiments, the processor 120 may transmit the received music to the server and may receive information about the music (e.g., the genre) from the server so as to identify the genre of music. In some other embodiments, the processor 120 may estimate of guess information about the music (e.g., the genre) based at least on the beats per minute (BPM), amplitude, or frequency of the received music.

In operation 709, the processor 120 may display the AR object superimposed on the image, based on the identified genre of music. For example, the processor 120 may receive AR objects stored in the memory 130 or AR objects stored in the server based on the identified genre of music. Specifically, the processor 120 may extract feature points of the image using the camera module 180. Based on the feature points, the processor 120 may display an AR object (e.g., a hair sticker or a hat sticker) corresponding to the configuration of the image (e.g., a head of a person) at a position (e.g., a head of a person) corresponding to the configuration. The processor 120 may identify that feature points of an image move within the image (e.g., a preview image or a moving image or video). The processor 120 may display a moving AR object based on moving feature points in an image (e.g., a preview image or a moving image or video).

The processor 120 may store an image in which an AR object is displayed in the memory 130 based on user input.

Figure 8:
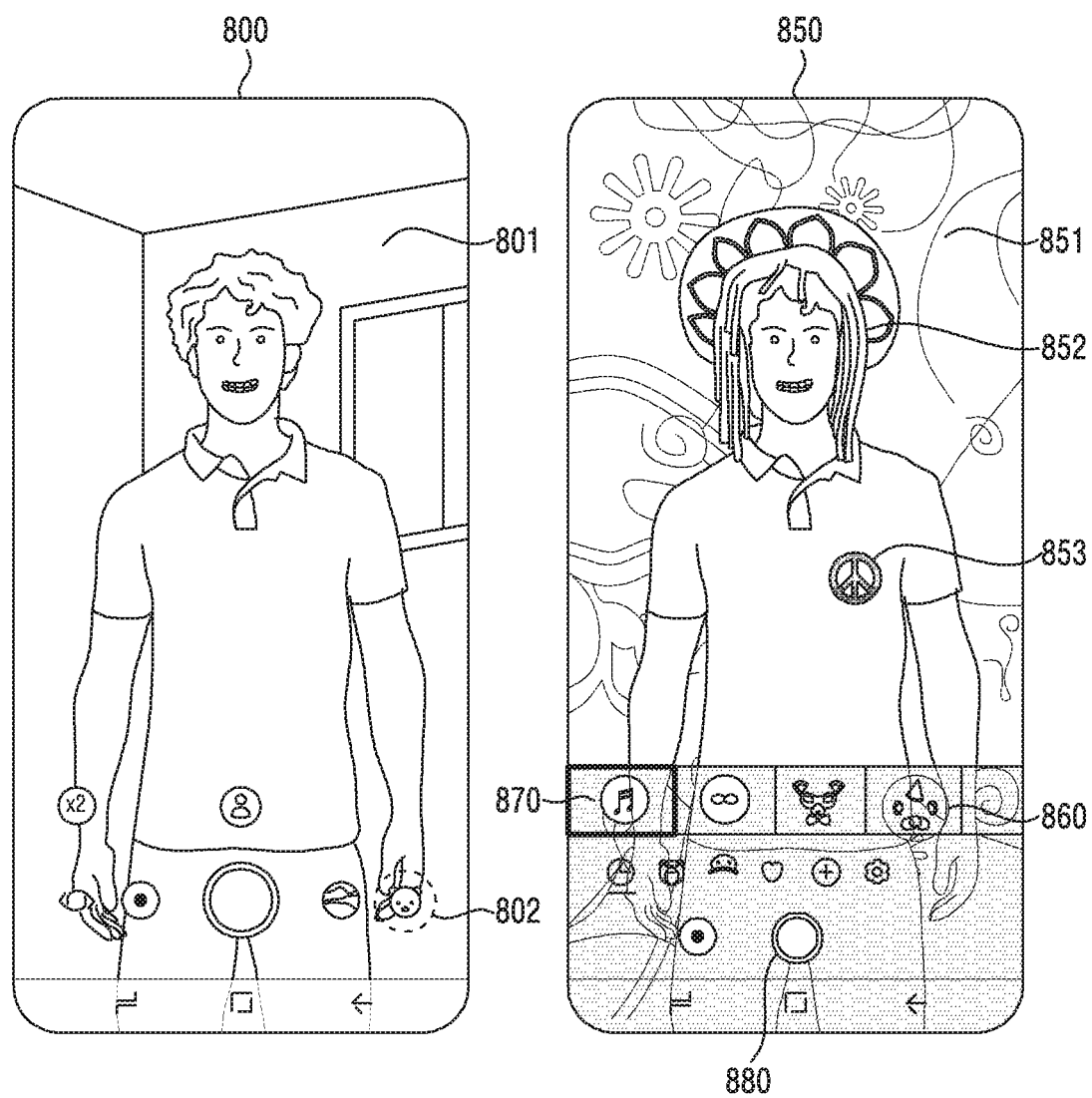
FIG. 8 illustrates exemplary screens of a camera application according to various embodiments.

FIG. 8 illustrates exemplary screens of a camera application according to various embodiments.

Referring to FIG. 8, a screen 800 or a screen 850 may represent an exemplary user interface (UI) of a camera application. For example, the electronic device 101 may display the screen 800 based on executing the camera application. The screen 800 may include a preview image 801 acquired through the camera module 180. The screen 800 may include an object 802 for entering the screen 850 about an AR object. The processor 120 may display the screen 850 changed (or switched) from the screen 800 in response to receiving input for the object 802. The screen 850 may be a screen for displaying an AR object superimposed on the preview image 801.

In some embodiments, the processor 120 may activate the microphone 550 in response to executing the camera application. The processor 120 may receive music through the microphone 550 while the screen 800 (and/or the screen 850) is being displayed, and may identify the genre of the music.

In some other embodiments, the processor 120 may activate the microphone 550 in response to receiving input for the object 802. The processor 120 may receive music through the microphone 550 in response to being switched to the screen 850 and may identify the genre of the music.

When the genre of the music is identified, the processor 120 may display AR objects (e.g., AR background 851, AR hat 852, and AR stamp 853) corresponding to the genre within the screen 850. For example, the identified genre may be a reggae genre 610. The processor 120 may read or retrieve information about AR objects included in the reggae genre 610 from the database 600, and based on the feature points about the preview image 801, the processor 120 may float an AR object related to the reggae.

The processor 120 may separate a person from the background in the preview image 801, and may extract feature points of the person. The processor 120 may display an AR background 851 corresponding to the genre of the music (e.g., genre, temp, mood, or intensity) on the background of the preview image 801. The processor 120 may display an AR hat 852 corresponding to the genre of the music on the head of the person included in the preview image 801 based on the feature points. The AR background 851 or the AR hat 852 may be determined to correspond to the genre of the music (e.g., genre, tempo, mood, or intensity) without user input.

The processor 120 may display a designated AR object irrelevant to the music in response to receiving input for an object 860. The processor 120 may display an AR object corresponding to the genre of music, which is being acquired or reproduced, in response to receiving input for an object 870.

The processor 120 may capture an image, in which an AR object is displayed, in response to receiving input for an object 880, and may store the captured image in the memory 130.

Figure 9:
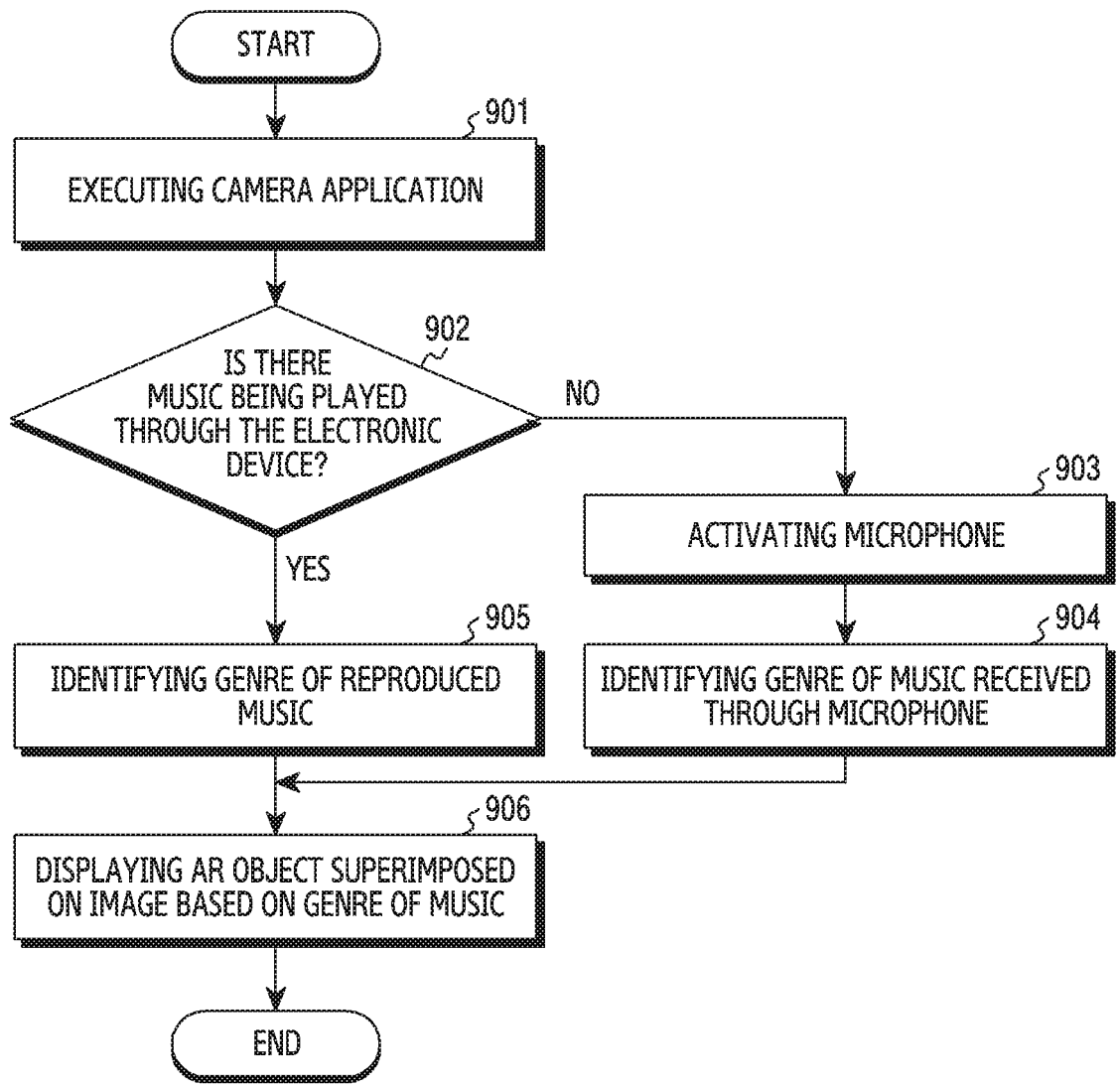
FIG. 9 illustrates an exemplary operation for identifying a genre of music in an electronic device according to various embodiments.

FIG. 9 illustrates an exemplary operation for identifying a genre of music in the electronic device 101 according to various embodiments.

Referring to FIG. 9, in operation 901, the processor 120 may execute a camera application. The processor 120 may display an image based on executing the camera application. For example, the image may be a preview image acquired through the camera module 180. As another example, the image may be an image stored in the memory 130 and displayed through a gallery (or a photo album) of the camera application.

In operation 902, the processor 120 may identify whether or not there is music being reproduced through the electronic device 101 based on executing the camera application. For example, the processor 120 may identify whether or not there is music being reproduced through the audio module 170 in response to initiating execution of the camera application.

In operation 903, the processor 120 may activate the microphone 550 based on determining that there is no music being reproduced through the electronic device 101. In operation 904, the processor 120 may identify the genre of the music received through the microphone 550.

In operation 905, based on determining that there is music being reproduced through the electronic device 101, the processor 120 may identify the genre of the music being reproduced. For example, the processor 120 may identify the genre of the music based on information on the music being reproduced through the audio module 170.

In operation 906, based on the identified genre of the music, the processor 120 may display an AR object superimposed on the image. The image may be a preview image or an image stored in the memory 130. The processor 120 may float an AR object corresponding to the genre of the music being reproduced or received on the image.

Figure 10:
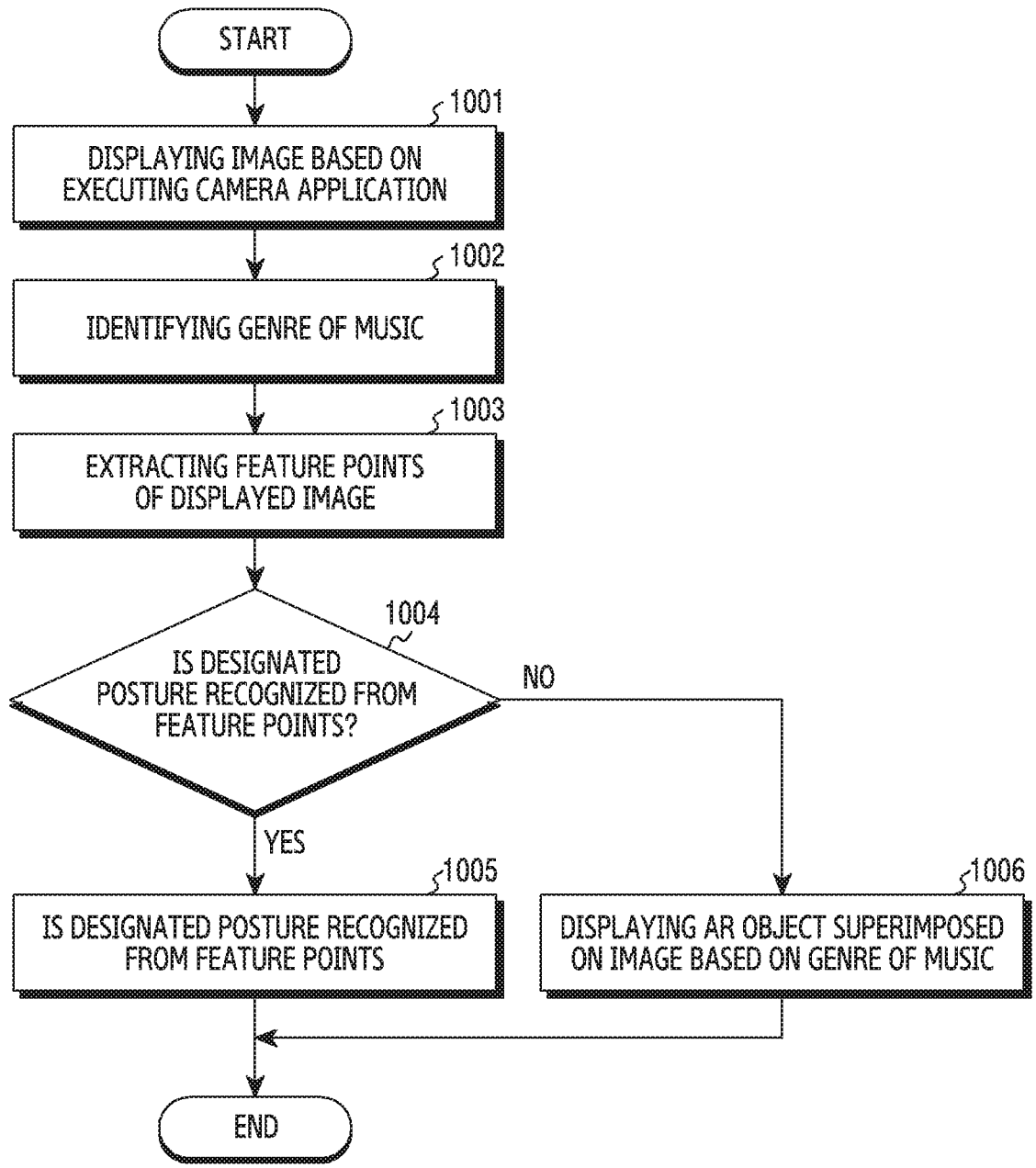
FIG. 10 illustrates an exemplary operation for displaying an AR object corresponding to a posture of a person included in an image in an electronic device according to various embodiments.

FIG. 10 illustrates an exemplary operation for displaying an AR object corresponding to a posture of a person included in an image in the electronic device 101 according to various embodiments.

Figure 11:
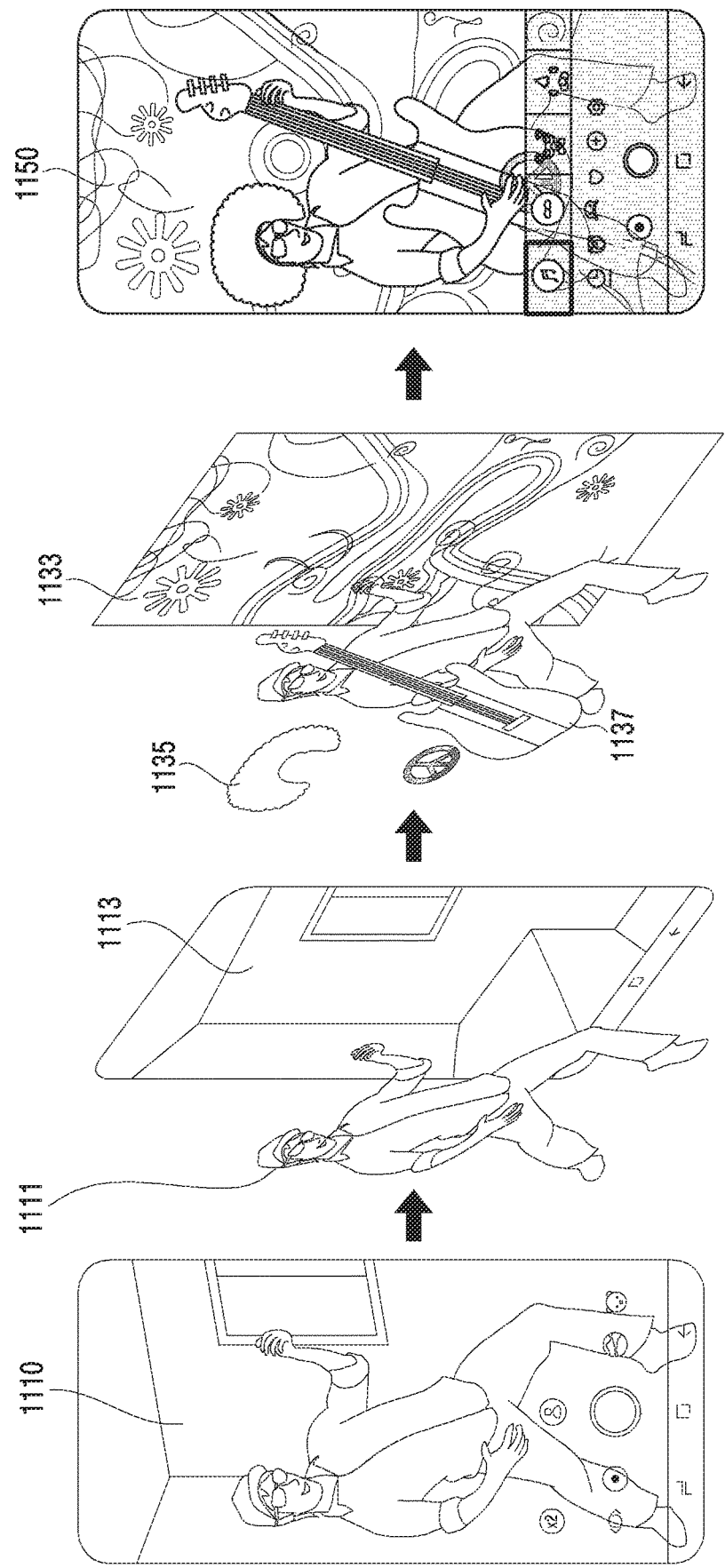
FIG. 11 illustrates an exemplary operation for displaying an AR object corresponding to a posture of a person included in an image in an electronic device according to various embodiments.

FIG. 11 illustrates an exemplary operation for displaying an AR object corresponding to a posture of a person included in an image in the electronic device 101 according to various embodiments.

Referring to FIG. 10, in operation 1001, the processor 120 may display an image based on executing a camera application. For example, the image may be a preview image acquired through the camera module 180 or an image stored in the memory 130 and displayed through a gallery (or a photo album) of the camera application. For example, referring to FIG. 11, the processor 120 may display an image 1110 through the display 210.

In operation 1002, the processor 120 may identify the genre of music. For example, the processor 120 may identify the genre of music reproduced through the audio module 170 or music received through the microphone 550.

In operation 1003, the processor 120 may extract feature points of the displayed image. For example, the processor 120 may use the camera module 180 to distinguish a person included in the image from the background and may identify the feature points related to the person. The processor 120 may identify (or recognize) the face (e.g., the eyes, nose, and mouth) or the gesture (or the posture) of the person included in the image using the feature points. For example, referring to FIG. 11, the processor 120 may distinguish a background 1113 and a person 1111 from the image 1110.

The order of operations 1002 and 1003 may be changed, or may be performed in parallel at the same time.

In operation 1004, the processor 120 may determine whether or not a designated posture is recognized from the feature points. The designated posture may include, for example, a posture of playing a guitar, a posture of playing a piano, a posture of playing a drum, and the like. For example, referring to FIG. 11, the processor 120 may recognize (or identify) a posture of playing a guitar based on analyzing the feature points of the person 1111.

In operation 1005, based on recognizing the designated posture, the processor 120 may display an AR object corresponding to the recognized posture and the genre of the identified music. For example, the processor 120 may read information about AR objects included in the reggae genre 610 from the database 600 based on identifying the genre of music as reggae. For example, referring to FIG. 11, the processor 120 may display the AR background 1133 corresponding to the reggae genre as a background of the image. The processor 120 may float AR hair 1135 corresponding to the reggae genre to the head of the person 1111. The processor 120 may identify the posture of the person 1111 as the posture of playing the guitar among a plurality of designated postures. Based on the identification, the processor 120 may float the AR guitar 1137 corresponding to the reggae genre as if the person 1111 is playing music. Consequently, the processor 120 may display an image 1150 in which AR objects are displayed through the display 210. The processor 120 may display an image 1150 changed from the image 1110 based on identifying the genre of the music and the designated posture.

In operation 1006, the processor 120 may display an AR object corresponding to the identified genre of the music based on not recognizing the designated posture. For example, when the posture of playing a musical instrument is not recognized, the processor 120 may not display the AR object representing the musical instrument. For example, the processor 120 may display the screen 850 of FIG. 8 when only the reggae genre is recognized and the posture is not recognized.

Figure 12:
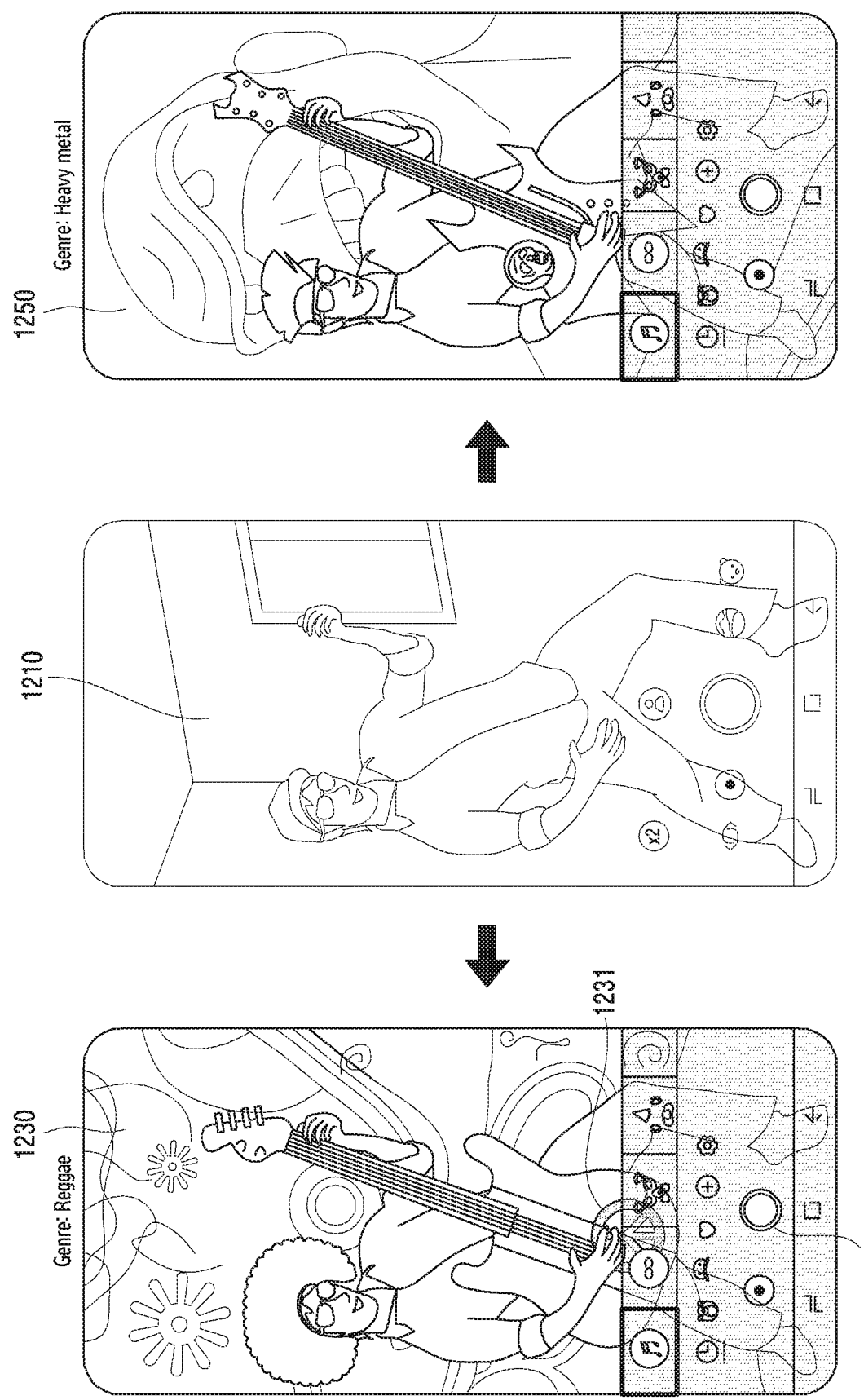
FIG. 12 illustrates exemplary AR objects displayed based on a genre of music identified in an electronic device according to various embodiments.

FIG. 12 illustrates exemplary AR objects displayed based on a genre of music identified in the electronic device 101 according to various embodiments.

Referring to FIG. 12, the processor 120 may display a screen 1210 based on executing the camera application. The screen 1210 may include a preview image acquired through the camera module 180.

The processor 120 may display a screen 1230 based on determining that the genre of received or reproduced music is reggae. For example, the processor 120 may read information about AR objects included in the reggae genre 610 of the database 600. The processor 120 may display the screen 1230 by plotting AR objects included in the reggae genre 610 at corresponding positions, based on analyzing feature points of the preview image. In some embodiments, the processor 120 may superimpose an AR stamp 1231 on another AR object (e.g., an AR other 1235). In some other embodiments, the processor 120 may superimpose the AR stamp 1231 on the body of the person, as in the screen 850. In some other embodiments, the processor 120 may superimpose the AR stamp 1231 on the background.

The processor 120 may display the screen 1250 based on determining that the genre of the received or reproduced music is heavy metal. For example, the processor 120 may read information about AR objects included in the heavy metal genre 630 of the database 600. The processor 120 may display the screen 1250 by plotting AR objects included in the heavy metal genre 630 at respective corresponding positions, based on analyzing the feature points of the preview image.

When user input for selecting an AR object to be displayed on the preview image is required, it may be necessary for the user to select a category corresponding to the genre of music using one hand and to select AR objects within the category. Therefore, when user input for selecting an AR object is required, there may be inconvenience in that one hand of the user is not free. The electronic device 101 according to various embodiments may recommend (or provide) an AR object corresponding to the genre of music whenever the genre of music is changed even if there is no user input. For example, when the music being reproduced around the electronic device 101 is changed from the reggae genre 610 to the heavy metal genre 630, the electronic device 101 may change the AR object corresponding to the reggae genre 610 may be changed to an AR object corresponding to the heavy metal genre 630. Whenever a user changes a posture in the environment in which music is reproduced around the electronic device 101, the electronic device 101 according to various embodiments may recommend an AR object corresponding to the genre of music or the posture even if there is no user input. For example, when the user's posture included in the preview image is changed from the posture of playing a guitar to the posture of playing a piano, the electronic device 101 may change an AR object corresponding to the guitar to an AR object corresponding to the piano even if there is no user input. The electronic device 101 according to various embodiments may bypass receiving user input by receiving music through the microphone 550 as information indicating the environment, in which the electronic device 101 is located, and displaying an AR object in the acquired preview image.

Figure 13:
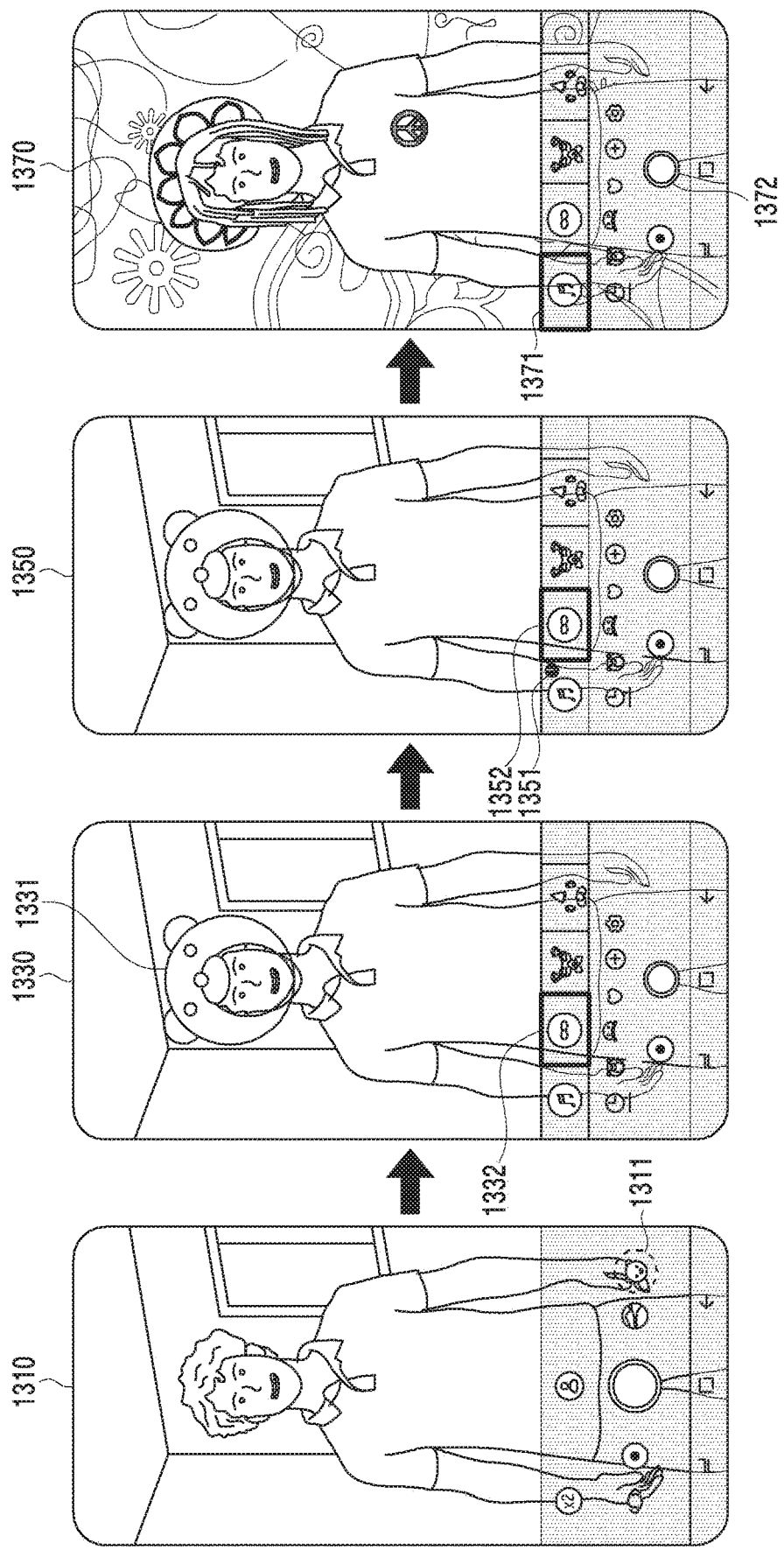
FIG. 13 illustrates exemplary screens when music is identified while a camera application is being executed in an electronic device according to various embodiments.

FIG. 13 illustrates exemplary screens when music is identified while a camera application is being executed in the electronic device 101 according to various embodiments.

Referring to FIG. 13, the processor 120 may display a screen 1310 based on executing a camera application. The screen 1310 may include a preview image acquired through the camera module 180. The screen 1310 may include an object 1311 for entering a screen for displaying an AR object. The processor 120 may identify the genre of music received through the microphone 550 or reproduced through the audio module 170 while the screen 1310 is being displayed.

When the genre of music is not identified, the processor 120 may display a screen 1330 switched from the screen 1310 based on receiving input for the object 1311. For example, when music is not reproduced through the audio module 170, when music is not received through the microphone 550, or when music received through the microphone 550 is not identified, the processor 120 may display the screen 1330 in response to receiving the input for the object 1311.

The processor 120 may display a designated AR object 1331 within the screen 1330. For example, the designated AR object 1331 may be randomly determined. The screen 1330 may include an indicator 1332 representing that the designated AR object is being displayed.

The processor 120 may monitor whether or not music is reproduced through the audio module 170 or may analyze an audio signal received through the microphone 550 even while the screen 1330 is being displayed. Accordingly, the processor 120 may identify the genre of music reproduced or received while the screen 1330 is being displayed. The processor 120 may display the screen 1350 switched from the screen 1330 in response to identifying the genre of music while the screen 1330 is being displayed. The screen 1350 may display an indicator 1351 indicating that the genre of music is identified. The indicator 1351 may be displayed on an object 1352 for entering the screen for displaying an AR object related to a genre of music.

In response to receiving input for the object 1352 on which the indicator 1351 is displayed, the processor 120 may display a screen 1370 switched from the screen 1350. The screen 1370 may automatically display an AR object corresponding to the identified music genre (e.g., reggae) without user input. The screen 1370 may include an indicator 1371 representing that an AR object corresponding to the music genre (e.g., reggae) is being displayed.

When the genre of music is identified in the state in which the screen 1310 is displayed, the processor 120 may display the screen 1370 switched from the screen 1310 based on receiving input for the object 1311.

The processor 120 may store the image in which the AR object is displayed in the memory 130 in response to receiving the input for the object 1372.

Figure 14:
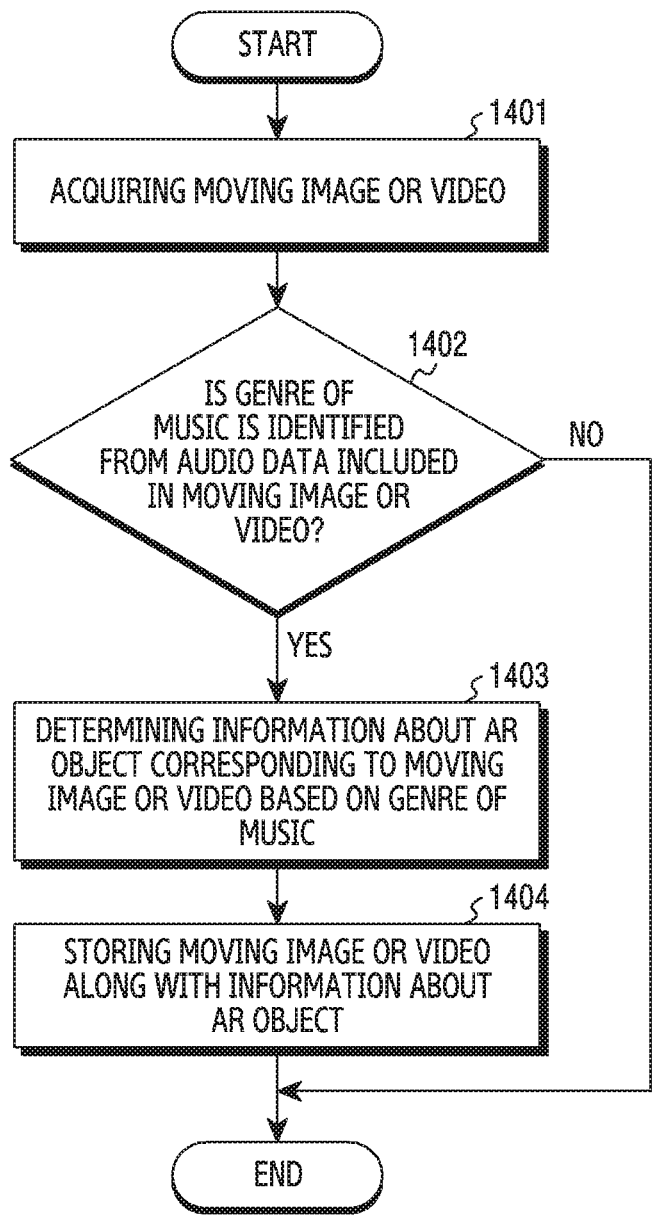
FIG. 14 illustrates an exemplary operation for storing a moving image or video acquired by an electronic device according to various embodiments, along with information about an AR object associated with the moving image or video.

FIG. 14 illustrates an exemplary operation for storing a moving image or video acquired by the electronic device 101 according to various embodiments, along with information about an AR object associated with the moving image or video.

Referring to FIG. 14, in operation 1401, the processor 120 may acquire (or capture) a moving image or video through a camera application.

In operation 1402, the processor 120 may determine whether or not a genre of music is identified from audio data included in the moving image or video. The processor 120 may terminate the operation when music is not identified or the genre of music is not identified from the audio data included in the moving image or video. For example, the processor 120 may store the acquired moving image or video in the memory 130.

In operation 1403, if the genre of music is identified from the audio data included in the moving image or video, the processor 120 may determine information on an AR object corresponding to the moving image or video based on the genre of music. For example, the processor 120 may determine information about an AR object corresponding to the moving image or video based on at least one of the genre, intensity, tempo, or mood of music identified for each frame of the moving image or video. The information about the AR object corresponding to the moving image or video may include the type and coordinates of the AR object to be displayed for each frame of the moving image or video.

In operation 1404, the processor 120 may store the acquired moving image or video along with information about the AR object. In some embodiments, operations 1401 to 1404 may be performed after a moving image or video is acquired through the camera module 180 and before the moving image or video is stored in the memory 130. In some other embodiments, operations 1401 to 1404 may be performed in response to receiving input for storing a moving image or video in memory 130.

Figure 15:
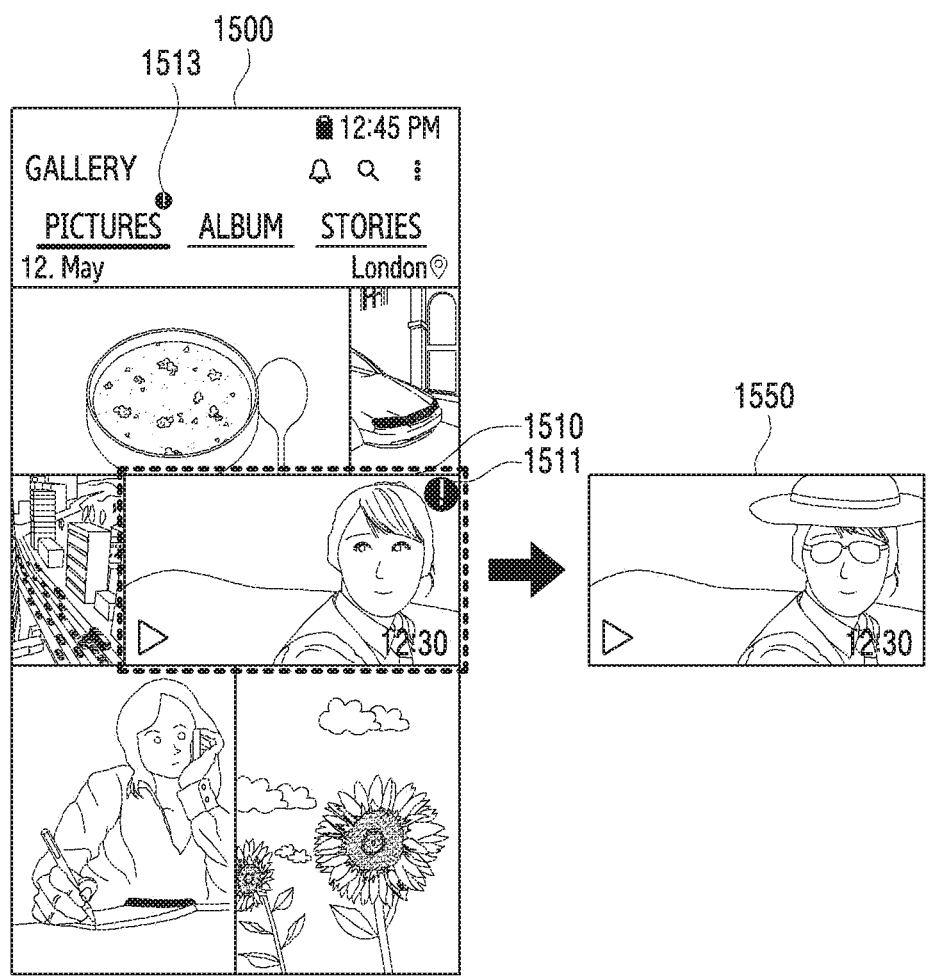
FIG. 15 illustrates an exemplary screen in which a moving image or video is stored along with information about an AR object in an electronic device according to various embodiments.

FIG. 15 illustrates an exemplary screen in which a moving image or video is stored along with information about an AR object in the electronic device 101 according to various embodiments.

Referring to FIG. 15, a screen 1500 may represent an exemplary UI of a photo album (or a gallery) related to a camera application. The processor 120 may display a thumbnail 1510 of a moving image or video acquired and stored through the camera application in the screen 1500. The audio data of the moving image or video may include music sound. The processor 120 may display an indicator 1511 representing the existence of an AR object related to music, based on identifying the genre of music from the audio data of the moving image or video. For example, the indicator 1511 may be superimposed on the thumbnail 1510 of the moving image or video. The processor 120 may display an indicator 1513 representing the existence of a moving image or video stored along with the AR object in the screen 1500.

The processor 120 may reproduce a moving image or video 1550 corresponding to the thumbnail 1510 in response to receiving input for the thumbnail 1510. For example, based on information about the AR object stored along with the moving image or video, the processor 120 may float the AR object on the moving image or video. The processor 120 may reproduce the moving image or video 1550 in which the AR object is displayed.

Figure 16:
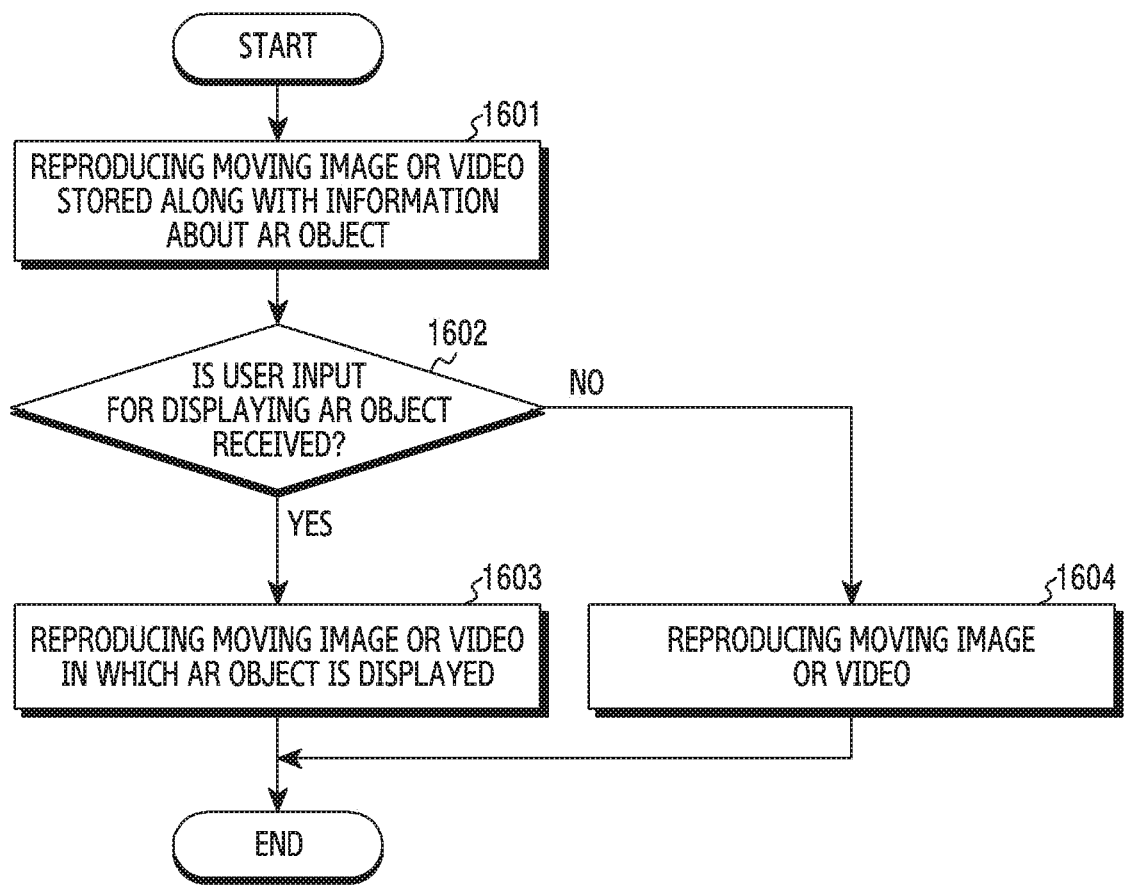
FIG. 16 illustrates an exemplary operation for reproducing a moving image or video in which an AR object is displayed in an electronic device according to various embodiments.

FIG. 16 illustrates an exemplary operation for reproducing a moving image or video in which an AR object is displayed in the electronic device 101 according to various embodiments.

Figure 17:
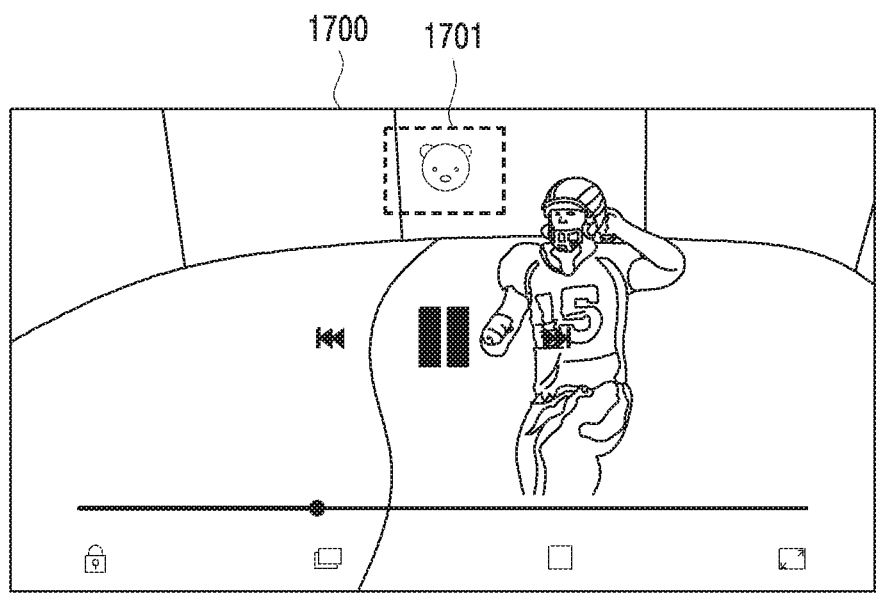
FIG. 17 illustrates an exemplary screen for reproducing a moving image or video in which an AR object is displayed in an electronic device according to various embodiments.

FIG. 17 illustrates an exemplary screen for reproducing a moving image or video in which an AR object is displayed in the electronic device 101 according to various embodiments.

Referring to FIG. 16, in operation 1601, the processor 120 may reproduce a moving image or video stored along with information about an AR object. For example, the moving image or video may be a moving image or video stored along with information about an AR object in operation 1404 of FIG. 14. For example, the processor 120 may reproduce a moving image or video in response to receiving input for the thumbnail 1510 in FIG. 15. For example, referring to FIG. 17, the processor 120 may display a screen 1700 while a moving image or video is being reproduced.

In operation 1602, the processor 120 may determine whether or not user input for displaying an AR object is received. For example, referring to FIG. 17, a screen 1700 may include an object 1701 for displaying an AR object.

In operation 1603, the processor 120 may reproduce a moving image or video in which the AR object is displayed in response to receiving user input for displaying the AR object. For example, the processor 120 may display a screen (not illustrated) in which the AR object is floated on the screen 1700 in response to receiving input for the object 1701. For example, based on information about an AR object (e.g., a frame to display the AR object, the type of the AR object, and the coordinates of the AR object) stored along with a moving image or video, the processor 120 may display the AR object. The AR object floated on the moving image or video may be changed based on music included in the moving image or video during the reproduction of the moving image or video.

In operation 1604, the processor 120 may reproduce a moving image or video in which the AR object is not displayed based on not receiving user input for displaying the AR object. For example, the processor 120 may display the screen 1700 based on not receiving user input for displaying the AR object.

When user input for acquiring information about the AR object is required, a noise, that is caused by the user's touch input while a moving image or video is being captured, may be included in the moving image or video. The electronic device 101 according to various embodiments may bypass receiving user input by identifying whether or not music is included in an audio signal received through the microphone 550 while a moving image or video is being captured, acquiring information about the AR object based on the identified music and image data included in the moving image or video, and storing the information about the acquired AR object.

According to various embodiments described above, a method of operating an electronic device (e.g., the electronic device 101) may include: an operation of displaying an image acquired using a camera module (e.g., the camera module 180) of the electronic device through a display of the electronic device; an operation of activating a microphone (e.g., the microphone 550) of the electronic device; an operation of receiving first music through the microphone; an operation of selecting a first augmented reality (AR) object based on a genre of the first music; and an operation of displaying the first AR object in the state of being superimposed on the image.

In various embodiments, the method may further include: an operation of identifying a person included in the image; selecting a second AR object corresponding to the identified posture and the genre of the first music; and an operation of displaying the second AR object in the state of being superimposed on the image.

In various embodiments, the method may further include: an operation of identifying whether or not the electronic device reproduces second music in the state in which the microphone is not activated; an operation of selecting a second AR object based on the second music in response to identifying that the electronic device reproduces the second music; and an operation of displaying the second AR object in the state of being superimposed on the image.

In various embodiments, the method may further include: an operation of acquiring a moving image or video through the camera module; an operation of identifying a genre of a second music included in audio data of the moving image or video; an operation of acquiring information about a second AR object corresponding to the moving image or video based on the genre of the second music; and an operation of storing the information about the second AR object along with the moving image or video. For example, the information about the second AR object corresponding to the moving image or video may include at least one of a frame to display the second AR object, a type of the second AR object, or a position to display the second AR object among frames of the moving image or video.

In various embodiments, the method may further include an operation of determining a genre of the first music based on at least one of beats per minute (BPM), an amplitude, or a frequency of the first music.

In various embodiments, the operation of selecting the first AR object may include an operation of selecting the first AR object corresponding to the genre of the first music among a plurality of AR objects stored in memory of the electronic device (e.g., the memory 130). For example, the operation of selecting the first AR object corresponding to the genre of the first music may include an operation of determining the first AR object among the plurality of first AR objects based on at least one of tempo, mood, or intensity of the first music when a plurality of AR objects corresponding to the genre of the first music are included in the plurality of AR objects.

In various embodiments, the method may further include an operation of transmitting, through a communication module of the electronic device, a signal about the first music to the server through the communication module; and an operation of receiving information about the first music from the server, and the information about the first music may include information about the genre of the first music.

In various embodiments, the method may further include an operation of displaying an indicator for representing existence of at least one AR object about the first music through the display.

Meanwhile, in the detailed description of the disclosure, specific embodiments have been described, but various modifications are possible without departing from the scope of the disclosure. Therefore, the scope of the disclosure should not be limited to the described embodiments, but should be determined not only based on the claims described below, but also based equivalents to the claims.

The invention claimed is:

1. An electronic device comprising:
   a display;
   a camera module;
   a microphone; and
   at least one processor,
   wherein the at least one processor is configured to:
      display an image acquired using the camera module through the display,
      identify a posture of a person included in the image,
      receive first music through the microphone,
      identify a genre of the received first music,
      select a first augmented reality (AR) object corresponding to the identified posture and the genre of the first music, and
      display the first AR object in a state of being superimposed on the image.

2. The electronic device of claim 1, wherein the at least one processor is further configured to:
   identify whether or not the electronic device reproduces second music in a state in which the microphone is not activated;
   select a second AR object based on the second music in response to identifying that the electronic device reproduces the second music; and
   display the second AR object in a state of being superimposed on the image.

3. The electronic device of claim 1, wherein the at least one processor is further configured to:

acquire a moving image or video through the camera module;

identify a genre of a second music included in audio data of the moving image or video;

acquire information about a second AR object corresponding to the moving image or video based on the genre of the second music; and store the information about the second AR object along with the moving image or video.

4. The electronic device of claim 3, wherein the information about the second AR object comprises at least one of a frame to display the second AR object, a type of the second AR object, or a position to display the second AR object among frames of the moving image or video.

5. The electronic device of claim 1, wherein the at least one processor is further configured to:

determine a genre of the first music based on at least one of beats per minute (BPM), an amplitude, or a frequency of the first music.

6. The electronic device of claim 1, further comprising:

memory configured to store a plurality of AR objects, wherein the at least one processor is further configured to:

select the first AR object corresponding to the genre of the first music among the plurality of AR objects stored in the memory.

7. The electronic device of claim 6, wherein the at least one processor is further configured to:

determine the first AR object among the plurality of AR objects based on at least one of tempo, mood, or intensity of the first music when a plurality of AR objects corresponding to the genre of the first music are included in the plurality of AR objects.

8. The electronic device of claim 1, further comprising:

a communication module, wherein the at least one processor is further configured to:

transmit a signal about the first music to a server through the communication module; and receive information about the first music from the server, and wherein the information about the first music comprises information about the genre of the first music.

9. The electronic device of claim 1, wherein the at least one processor is further configured to:

display an indicator for representing existence of at least one AR object about the first music through the display.

10. A method of operating an electronic device, the method comprising:

displaying an image acquired using a camera module of the electronic device through a display of the electronic device;

identifying a posture of a person included in the image;

receiving first music through a microphone;

identifying a genre of the received first music;

selecting a first augmented reality (AR) object corresponding to the identified posture and the genre of the first music; and displaying the first AR object in a state of being superimposed on the image.

11. The method of claim 10, further comprising:

identifying whether or not the electronic device reproduces second music in a state in which the microphone is not activated:

selecting a second AR object based on the second music in response to identifying that the electronic device reproduces the second music; and displaying the second AR object in a state of being superimposed on the image.

12. The method of claim 10, further comprising:

acquiring a moving image or video through the camera module;

identifying a genre of a second music included in audio data of the moving image or video;

acquiring information about a second AR object corresponding to the moving image or video based on the genre of the second music; and storing the information about the second AR object along with the moving image or video.

13. The method of claim 12, wherein the information about the second AR object comprises at least one of a frame to display the second AR object, a type of the second AR object, or a position to display the second AR object among frames of the moving image or video.

14. The method of claim 10, further comprising:

determining a genre of the first music based on at least one of beats per minute (BPM), an amplitude, or a frequency of the first music.

15. The method of claim 10, further comprising:

storing a plurality of AR objects; and selecting the first AR object corresponding to the genre of the first music among the plurality of AR objects stored in a memory.

16. The method of claim 15, further comprising:

determining the first AR object among the plurality of AR objects based on at least one of tempo, mood, or intensity of the first music when a plurality of AR objects corresponding to the genre of the first music are included in the plurality of AR objects.

17. The method of claim 10, further comprising:

transmitting a signal about the first music to a server; and receiving information about the first music from the server, and the information about the first music comprises information about the genre of the first music.

18. The method of claim 10, further comprising:

displaying an indicator for representing existence of at least one AR object about the first music through the display.

* * * * *